United States Patent
Kogami et al.

(10) Patent No.: US 12,218,365 B2
(45) Date of Patent: Feb. 4, 2025

(54) POWER SUPPLY DEVICE, ELECTRIC VEHICLE EQUIPPED WITH SAID POWER SUPPLY DEVICE, AND POWER STORAGE DEVICE

(71) Applicant: SANYO Electric Co., Ltd., Osaka (JP)

(72) Inventors: Nao Kogami, Hyogo (JP); Hiroyuki Takahashi, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 534 days.

(21) Appl. No.: 17/619,989

(22) PCT Filed: Jun. 15, 2020

(86) PCT No.: PCT/JP2020/023444
§ 371 (c)(1),
(2) Date: Dec. 16, 2021

(87) PCT Pub. No.: WO2020/262080
PCT Pub. Date: Dec. 30, 2020

(65) Prior Publication Data
US 2022/0359945 A1    Nov. 10, 2022

(30) Foreign Application Priority Data
Jun. 28, 2019    (JP) .................................. 2019-122220

(51) Int. Cl.
*H01M 50/209*    (2021.01)
*H01M 10/625*    (2014.01)
(Continued)

(52) U.S. Cl.
CPC ....... *H01M 50/209* (2021.01); *H01M 10/625* (2015.04); *H01M 10/658* (2015.04);
(Continued)

(58) Field of Classification Search
None
See application file for complete search history.

(56) References Cited

U.S. PATENT DOCUMENTS

| | | | |
|---|---|---|---|
| 2012/0003526 A1* | 1/2012 | Kume | H01M 10/0481 429/151 |
| 2012/0171544 A1* | 7/2012 | Gutsch | H01M 10/613 429/120 |

(Continued)

FOREIGN PATENT DOCUMENTS

| | | |
|---|---|---|
| CN | 103094495 A | 5/2013 |
| CN | 109790951 A | 5/2019 |

(Continued)

OTHER PUBLICATIONS

English Translation of Chinese Search Report dated Feb. 15, 2023 for the related Chinese Patent Application No. 202080033395.9.

(Continued)

*Primary Examiner* — Gregg Cantelmo
(74) *Attorney, Agent, or Firm* — WHDA, LLP

(57) ABSTRACT

A power supply device includes a battery block formed by stacking a plurality of battery cells in a thickness with separator interposed between corresponding battery cells, a pair of end plates disposed on respective end faces of the battery block, and a binding bar coupled to the pair of end plates to fix the battery block in a compressed state together with the end plates. Separator includes heat-insulating sheet and elastic layer layered on a surface of heat-insulating sheet, elastic layer having elastic protrusion that is partially in adhesion to a case surface of battery cell and is deformed by expansion of battery cell, and deformation space is provided for elastic protrusion pressed by battery cell to be displaced in an outer peripheral direction orthogonal to a pressing direction.

9 Claims, 13 Drawing Sheets

(51) Int. Cl.
    *H01M 10/658*    (2014.01)
    *H01M 50/242*    (2021.01)
    *H01M 50/249*    (2021.01)
    *H01M 50/264*    (2021.01)
    *H01M 50/289*    (2021.01)
    *H01M 50/291*    (2021.01)
    *H01M 50/293*    (2021.01)

(52) U.S. Cl.
    CPC ....... *H01M 50/242* (2021.01); *H01M 50/249* (2021.01); *H01M 50/264* (2021.01); *H01M 50/289* (2021.01); *H01M 50/291* (2021.01); *H01M 50/293* (2021.01); *H01M 2220/20* (2013.01)

(56) References Cited

U.S. PATENT DOCUMENTS

| | | | |
|---|---|---|---|
| 2013/0108908 A1 | 5/2013 | Omura et al. | |
| 2014/0120391 A1* | 5/2014 | Park | H01M 50/271 429/72 |
| 2014/0335398 A1 | 11/2014 | Partin et al. | |
| 2015/0333305 A1 | 11/2015 | Seki et al. | |
| 2019/0190098 A1 | 6/2019 | Abe | |
| 2020/0343495 A1 | 10/2020 | Kritzer et al. | |
| 2021/0143508 A1 | 5/2021 | Yoshida | |

FOREIGN PATENT DOCUMENTS

| | | | | |
|---|---|---|---|---|
| EP | 3952009 A1 | | 2/2022 | |
| JP | 2011-023302 A | | 2/2011 | |
| JP | 2015-220117 | | 12/2015 | |
| JP | 2017-045508 A | | 3/2017 | |
| JP | 2018-204708 A | | 12/2018 | |
| WO | WO-2018110055 A1 | * | 6/2018 | ............ B32B 27/12 |
| WO | 2019/042698 A1 | | 3/2019 | |
| WO | 2019/123903 A1 | | 6/2019 | |

OTHER PUBLICATIONS

The EPC Office Action dated Mar. 24, 2023 for the related European Patent Application No. 20833165.2.
International Search Report of PCT application No. PCT/JP2020/023444 dated Sep. 8, 2020.
The Extended European Search Report dated Apr. 28, 2022 for the related European Patent Application No. 20833165.2.

* cited by examiner

POWER SUPPLY DEVICE, ELECTRIC VEHICLE EQUIPPED WITH SAID POWER SUPPLY DEVICE, AND POWER STORAGE DEVICE

CROSS-REFERENCE TO RELATED APPLICATIONS

This application is a U.S. national stage application of the PCT International Application No. PCT/JP2020/023444 filed on Jun. 15, 2020, which claims the benefit of foreign priority of Japanese patent application No. 2019-122220 filed on Jun. 28, 2019, the contents all of which are incorporated herein by reference.

TECHNICAL FIELD

The present invention relates to a power supply device with a large number of battery cells stacked, and an electric vehicle and a power storage device that include the power supply device.

BACKGROUND ART

A power supply device with a large number of battery cells stacked is suitable for a power supply that is mounted on an electric vehicle and supplies electric power to a motor that drives the vehicle, a power supply that is charged with natural energy, such as a solar battery, or midnight power, and a backup power supply for power failure. The power supply device having this structure includes a separator interposed between corresponding battery cells stacked. The separator insulates heat conduction between battery cells and suppresses induction of thermal runaway of a battery cell. The thermal runaway of the battery cell occurs due to an internal short circuit caused when a positive electrode and a negative electrode are short-circuited internally, erroneous handling, or the like. When the thermal runaway of the battery cell occurs, a large amount of heat is generated. Thus, the separator having insufficient heat insulation characteristics induces thermal runaway in adjacent battery cells. When the thermal runaway of the battery cells is induced, the entire power supply device releases extremely large heat energy to result in impairing safety of the device. To prevent this adverse effect, a heat-insulating sheet is interposed between the battery cells stacked.

A power supply device including a plurality of battery cells stacked with a separator of a heat-insulating sheet interposed between corresponding battery cells causes the battery cells to expand while the battery cells are charged or discharged. To dispose each of the battery cells expanding at a fixed position, a battery block of the battery cells stacked is provided at its respective end faces with a pair of end plates, and the pair of end plates are coupled by binding bars. The binding bars and the end plates hold the battery cells in a compressed state under a considerably strong pressure to prevent malfunction due to relative movement or vibration of the battery cells. (See PTL 1).

CITATION LIST

Patent Literature

PTL 1: Unexamined Japanese Patent Publication No. 2015-220117

SUMMARY OF THE INVENTION

The power supply device in which the battery cells are fixed in a compressed state includes the pair of end plates disposed on the respective end faces of the battery block, and the binding bars that couple the end plates while the battery block is held in a compressed state under a considerably strong pressure applied from the respective end faces. The power supply device strongly presses and fixes the battery cells to prevent malfunction due to relative movement or vibration of the battery cells. When the power supply device uses, for example, a battery cell with a stacked surface having an area of about 100 $cm^2$, the end plates are pressed with a strong force of several tons and fixed with the binding bars. The power supply device having this structure includes a separator having excellent heat insulation characteristics that is used to block heat conduction of the battery cells stacked adjacent to each other. The separator having excellent heat insulation characteristics is produced to reduce heat conduction, and thus cannot absorb expansion of the battery cells while the battery cells rise in internal pressure and expand. Thus, when the battery cells expand, contact pressure with the separator rapidly increases, and then an extremely strong force acts on the end plates and the binding bars. This may cause an adverse effect in which the end plates and the binding bars are each required to have a very strong material and shape, thereby increasing weight, size, and material cost of the power supply device.

The power supply device includes a separator provided on its entire surface with a rubber-like elastic sheet, and stacking the rubber-like elastic sheet on the entire surface of a battery cell enables absorbing expansion of the battery cell. The separator absorbs expansion of the battery cell when the rubber-like elastic sheet pressed against the battery cell is thinly pressed. The rubber-like elastic sheet absorbing the expansion of the battery cell in this state decreases in volume to absorb the expansion of the battery cell, so that it is difficult to reasonably absorb the expansion of the battery cell.

The present invention has been developed to solve the above disadvantage, and an object of the present invention is to provide a technique capable of smoothly absorbing expansion of a battery cell fixed in a compressed state.

A power supply device according to an aspect of the present invention includes battery block 10 formed by stacking a plurality of battery cells 1 in a thickness with separator 2 interposed between corresponding battery cells 1, a pair of end plates 3 disposed on respective end faces of battery block 10, and binding bar 4 coupled to the pair of end plates 3 to fix battery block 10 in a compressed state together with end plates 3. Separator 2 includes heat-insulating sheet 5 and elastic layer 6 layered on a surface of heat-insulating sheet 5, elastic layer 6 having elastic protrusion 6a that is partially in adhesion to a case surface of battery cell 1 and is deformed by expansion of battery cell 1, and deformation space 7 provided between battery cell 1 and separator 2 for elastic protrusion 6a pressed by battery cell 1 to be displaced in an outer peripheral direction orthogonal to a pressing direction.

An electrified vehicle according to an aspect of the present invention includes power supply device 100 described above, traction motor 93 that receives electric power from power supply device 100, vehicle body 91 that incorporates power supply device 100 and motor 93, and wheel 97 that is driven by motor 93 to let vehicle body 91 travel.

A power storage device according to an aspect of the present invention includes power supply device 100 described above and power supply controller 88 to control charging and discharging of power supply device 100. Power supply controller 88 enables charging of secondary battery cells 1 with electric power supplied from an outside and controls secondary battery cells 1 to charge.

The power supply device described above is characterized in that the expansion of the battery cell fixed in a compressed state is absorbed by the separator, and the battery cell can be prevented from expanding to apply excessive stress to the end plates and the binding bars.

DESCRIPTION OF EMBODIMENTS

Figure 1:
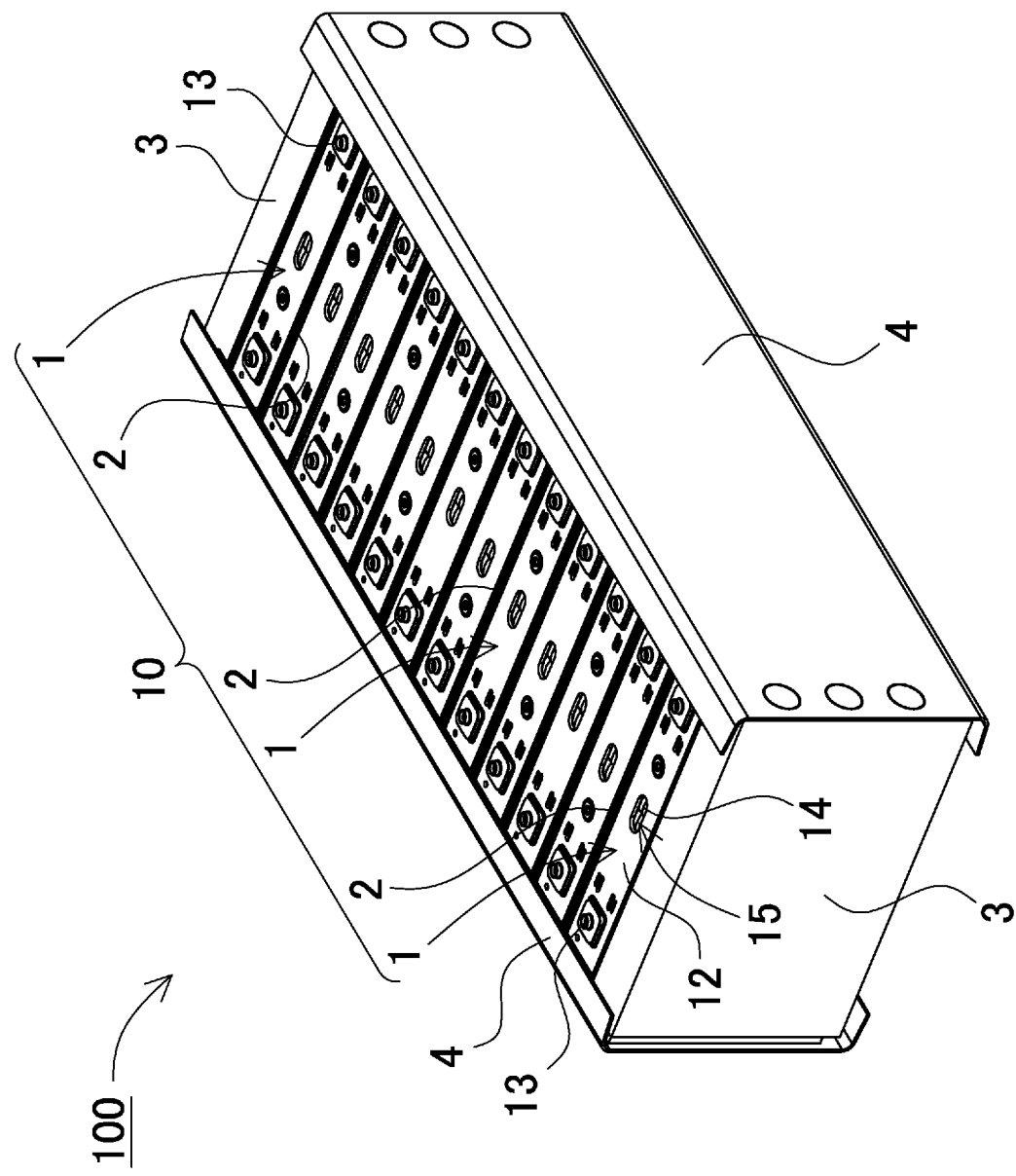
FIG. 1 is a perspective view of a power supply device according to an exemplary embodiment of the present invention.

Hereinafter, the present invention will be described in detail with reference to the drawings. In the following description, terms (e.g., "top", "bottom", and other terms including those terms) indicating specific directions or positions are used as necessary; however, the use of those terms is for facilitating the understanding of the invention with reference to the drawings, and the technical scope of the present invention is not limited by the meanings of the terms. Parts denoted by the same reference numerals in a plurality of drawings indicate the identical or equivalent parts or members. The exemplary embodiments described below are specific examples of the technical idea of the present invention, and the present invention is not limited to the following exemplary embodiments. Unless specifically stated otherwise, the dimensions, materials, shapes, and relative placement, and the like, of the components described below are not intended to limit the scope of the present invention, and are intended to be illustrative. The contents described in one exemplary embodiment and one example are also applicable to other exemplary embodiments and examples. Additionally, sizes, positional relationships, and the like of members illustrated in the drawings may be exaggerated for clarity of description.

A power supply device according to a first exemplary embodiment of the present invention includes a battery block formed by stacking a plurality of battery cells in a thickness with a separator interposed between corresponding battery cells, a pair of end plates disposed on respective end faces of the battery block, and a binding bar coupled to the pair of end plates to fix the battery block in a compressed state together with the end plates, in which the separator includes a heat-insulating sheet and an elastic layer layered on a surface of the heat-insulating sheet, the elastic layer having an elastic protrusion that is partially in adhesion to a case surface of the battery cell and is deformed by expansion of the battery cell, and a deformation space is provided between the battery cell and the separator for the elastic protrusion pressed by battery cell to be displaced in an outer peripheral direction orthogonal to a pressing direction.

The power supply device described above includes the separator that reasonably absorbs expansion due to a rise in internal pressure of the battery cell. This enables reducing stress acting on the end plates and the binding bars even when the battery cell expanding is disposed at a fixed position and the battery cell further expands. This is because the separator includes the elastic layer on the surface of the heat-insulating sheet, the elastic layer having the elastic protrusion that is partially in adhesion to the case surface of the battery cell and is deformed by expansion of the battery cell, and the deformation space is provided for the elastic protrusion pressed by the battery cell to be displaced in the outer peripheral direction orthogonal to the pressing direction.

The separator can also absorb expansion of the battery cell by layering an elastic sheet on the entire surface of the heat-insulating sheet. The elastic sheet decreases in thickness due to expansion of the battery cell to absorb the expansion of the battery cell, and thus needs to decrease in volume to absorb the expansion of the battery cell. For the amount of displacement due to the decrease in volume of the elastic sheet, controlling and optimally setting the amount of displacement per pressing force is difficult.

The power supply device described includes the elastic layer provided in the separator, being provided with the elastic protrusion, and the deformation space that is provided for the elastic protrusion to be pressed and deformed. The elastic protrusion is pushed out into the deformation space to decrease in thickness when pressed by the expanding battery cell. Unlike the elastic sheet layered on the entire surface of the battery cell, the elastic sheet decreasing in thickness only with change in density, the elastic protrusion is deformed into the deformation space to decrease in thickness. Thus, the elastic protrusion has an advantage in that expansion of the battery cell can be reasonably absorbed, and a range enabling the expansion of the battery cell to be absorbed can be increased.

Figure 14:
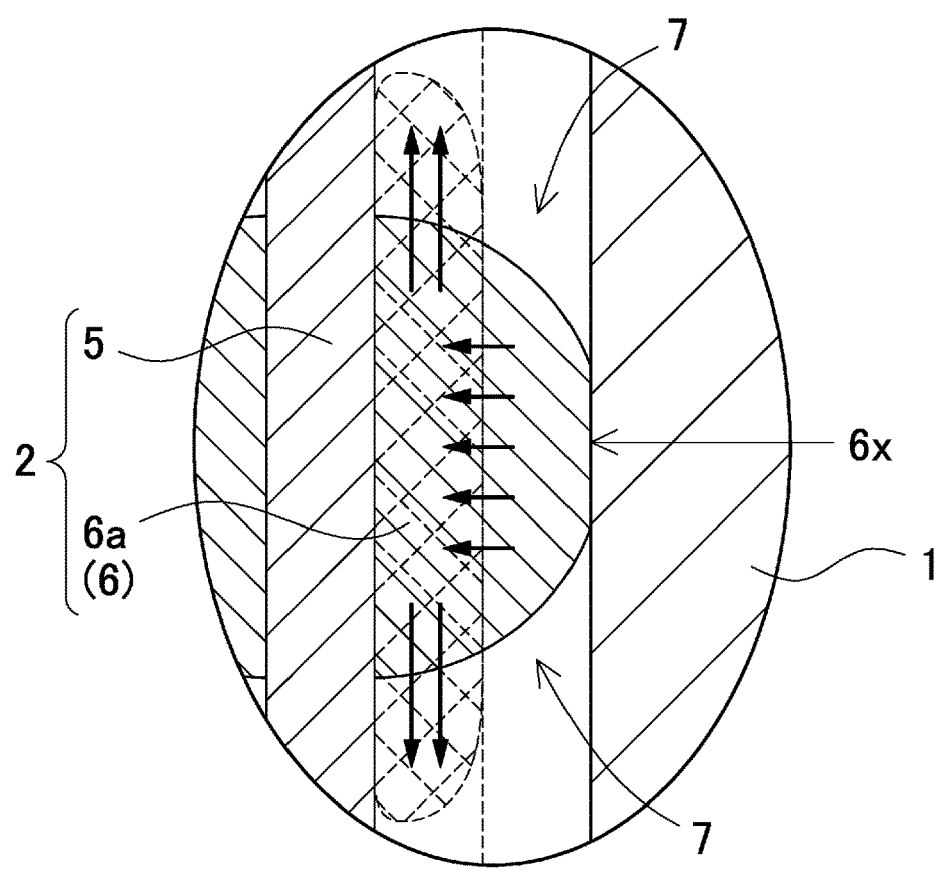
FIG. 14 is an enlarged sectional view of a main part illustrating a state in which an elastic layer is deformed.

As illustrated in the enlarged sectional view of FIG. 14, the power supply device described above is configured such that when battery cell 1 expands to press elastic protrusion 6a of elastic layer 6, an elastic body of elastic protrusion 6a is deformed toward deformation space 7 as indicated by an arrow. The elastic body has incompressibility in which volume hardly changes due to compression. Thus, when elastic protrusion 6a is thinly compressed, the elastic body protrudes from elastic protrusion 6a and is pushed out in a direction orthogonal to the pressing direction to be displaced toward deformation space 7. The elastic body being displaced into deformation space 7 deforms elastic protrusion 6a thinly. The power supply device, in which the battery cell expands to displace the elastic body of the elastic protrusion into the deformation space, effectively absorbs expansion of the battery cell with the separator, thereby preventing positional displacement of the battery cell, and reducing stress on the end plates and the binding bars. This power supply device can prevent damage by reducing strength of the binding bars of the end plates, so that the power supply device also achieves an advantage in that the end plates and the binding bars can be reduced in weight.

The power supply device described above causes the elastic layer to be thinly deformed due to expansion of the battery cell, and thus can reduce relative positional displacement due to the expansion of the battery cell. The relative positional displacement between the adjacent battery cells causes damage to a bus bar made of a metal sheet fixed to an electrode terminal of each of the battery cells and the electrode terminal. The power supply device, in which the elastic layer can prevent relative positional displacement of the battery cells expanding, can prevent failure of a connection part between the electrode terminal and the bus bar due to the expansion of the battery cells.

In a power supply device according to a second exemplary embodiment of the present invention, a heat-insulating sheet is made of a hybrid material of an inorganic powder and a fibrous reinforcing material.

The power supply device described above also achieves an advantage in that the heat-insulating sheet is reduced in thermal conductivity to improve heat insulation characteristics of the separator and the elastic layer absorbs expansion of the battery cell, thereby enabling reduction in adverse effect of deterioration of the heat insulation characteristics when the hybrid material of the heat-insulating sheet is pressed.

In a power supply device according to a third exemplary embodiment of the present invention, an inorganic powder is silica aerogel.

The power supply device described above also achieves an advantage in that the heat-insulating sheet is extremely reduced in thermal conductivity to remarkably improve heat insulation characteristics of the separator and the elastic layer absorbs expansion of the battery cell, thereby enabling reduction in adverse effect of deterioration of the heat insulation characteristics of the silica aerogel of the heat-insulating sheet when the silica aerogel is pressed.

The heat-insulating sheet composed of the fibrous reinforcing material and the silica aerogel exhibits excellent heat insulation characteristics due to extremely low thermal conductivity of the silica aerogel of fine inorganic particles, and is not deformed in thickness even when pressed due to the silica aerogel of an inorganic fluid filled in gaps between fibers of the heat-insulating sheet. When this heat-insulating sheet is pressed under strong pressure from the battery cell to have increased compressive stress, the silica aerogel of the inorganic particles is broken to deteriorate the heat insulation characteristics. The silica aerogel is fine particles composed of a skeleton of silicon dioxide ($SiO_2$) and 90% to 98% air. When strong compressive stress acts, the silica aerogel is broken to decrease in thermal conductivity. The elastic layer layered on the surface of the heat-insulating sheet is thinly deformed by pressure from the battery cell, so that the compressive stress on the silica aerogel, which is increased by expansion of the battery cell, is reduced. This structure prevents the battery cells expanding from pressing the heat-insulating sheet to break the silica aerogel, so that the excellent heat insulation characteristics of the heat-insulating sheet are maintained. Even when the battery cells expand, the separator maintained in excellent heat insulation characteristics keeps adjacent battery cells in an excellent heat insulating state for a long period of time to prevent thermal runaway of the battery cell from being induced to the adjacent battery cells, thereby ensuring safety of the power supply device for a long period of time.

The power supply device described above causes the elastic layer layered on the heat-insulating sheet to be thinly deformed to reduce internal stress of the heat-insulating sheet when the battery cells expand, so that no special structure for deforming the heat-insulating sheet itself under pressure is required. Thus, deterioration in the heat insulation characteristics due to breakage of the silica aerogel can be reduced while a heat-insulating sheet that is not crushed under pressure is used.

In a power supply device according to a fourth exemplary embodiment of the present invention, the elastic layer is provided at its central part with an elastic protrusion that protrudes to be in adhesion to the battery cell.

The power supply device described above has an advantage in that the elastic protrusion of the elastic layer can be more smoothly deformed by being pressed by the battery cell expanding to absorb the expansion of the battery cell. This is because the amount of displacement of a rubber-like elastic body of the elastic protrusion is reduced to enable increasing the amount of variation of the rubber-like elastic body crushed thinly.

In a power supply device according to a fifth exemplary embodiment of the present invention, the elastic layer is provided with a plurality of elastic protrusions. The power supply device described above has an advantage in that an expansion state of the battery cell expanding can be controlled to an optimum state by adjusting arrangement of the elastic protrusions to be provided.

In a power supply device according to a sixth exemplary embodiment of the present invention, a deformation space is provided as a gap formed between elastic protrusions adjacent to each other. The power supply device described above has an advantage in that each elastic protrusion can be smoothly deformed to absorb expansion of the battery cell.

In a power supply device according to a seventh exemplary embodiment of the present invention, the separator is provided with elastic layers layered on both surfaces of the heat-insulating sheet.

In a power supply device according to an eighth exemplary embodiment of the present invention, the elastic protrusion is bonded to the case surface of the battery cell. The power supply device described above has an advantage in that the elastic protrusion can be disposed on the surface of the battery cell without positional displacement.

In a power supply device according to a ninth exemplary embodiment of the present invention, the elastic layer is made of at least one selected from synthetic rubber, thermoplastic elastomer, and urethane foam.

In a power supply device according to a tenth exemplary embodiment of the present invention, the elastic layer has a thickness of 0.2 mm or more and 3 mm or less in an uncompressed state.

First Exemplary Embodiment

Hereinafter, a power supply device will be more specifically described in detail.

Figure 2:
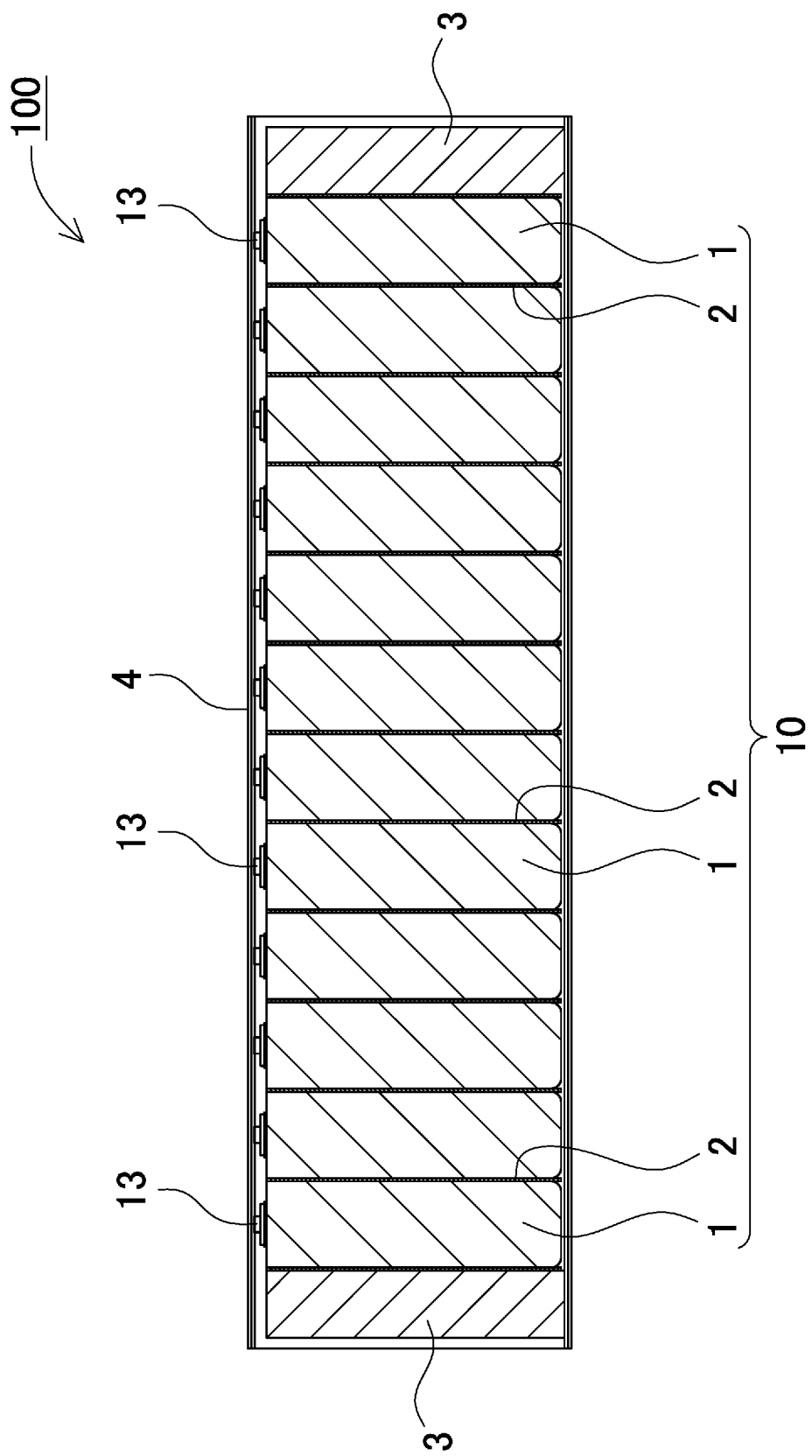
FIG. 2 is a vertical sectional view of the power supply device illustrated in FIG. 1.
Figure 3:
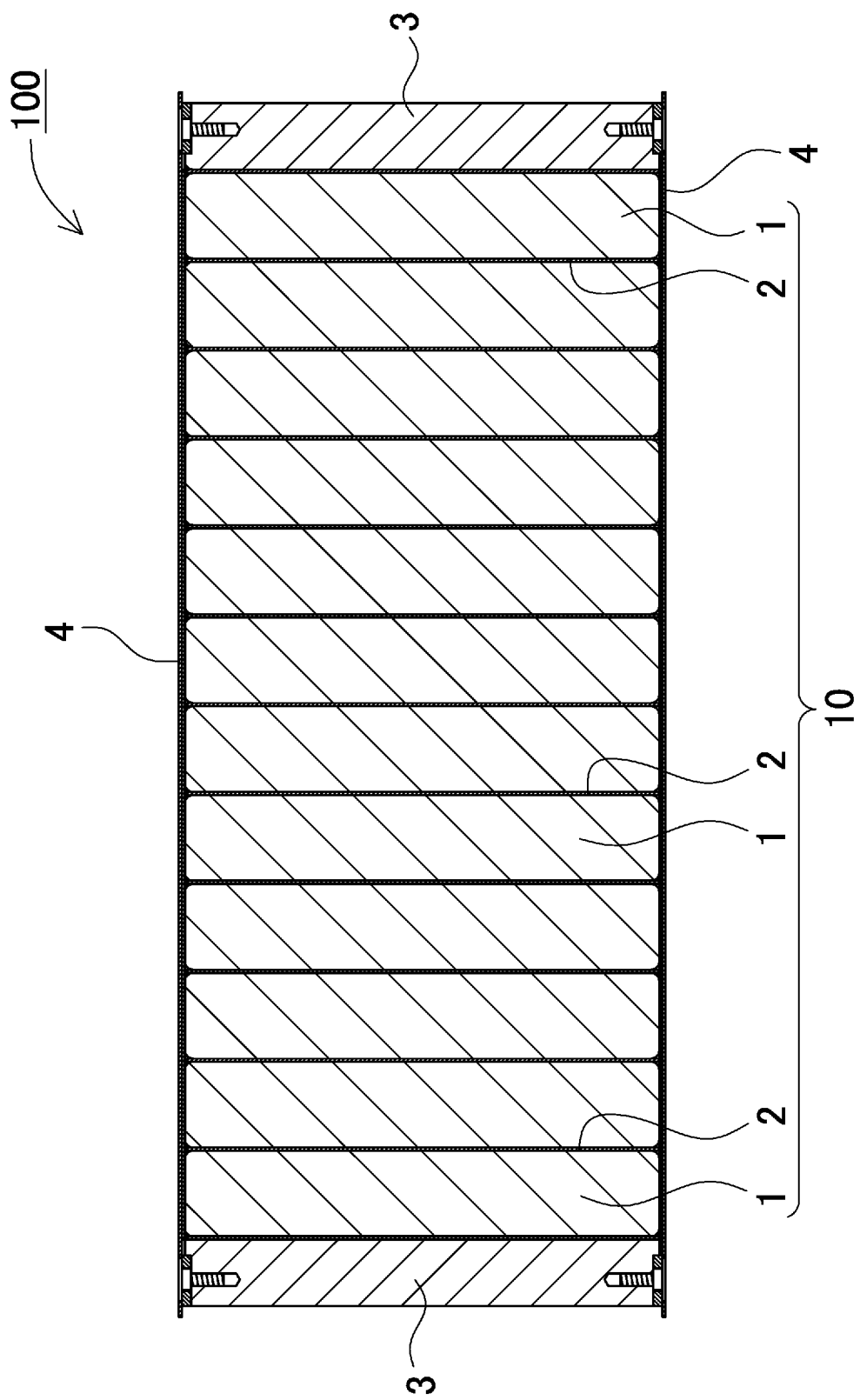
FIG. 3 is a horizontal sectional view of the power supply device illustrated in FIG. 1.

Power supply device 100 illustrated in the perspective view of FIG. 1, the vertical sectional view of FIG. 2, and the horizontal sectional view of FIG. 3 includes battery block 10 in which a plurality of battery cells 1 is stacked in a thickness with separator 2 interposed between corresponding battery cells 1, a pair of end plates 3 disposed on respective end faces of battery block 10, and binding bar 4 that couples the pair of end plates 3 to fix battery block 10 in a compressed state together with end plates 3.

(Battery Block 10)

Figure 4:
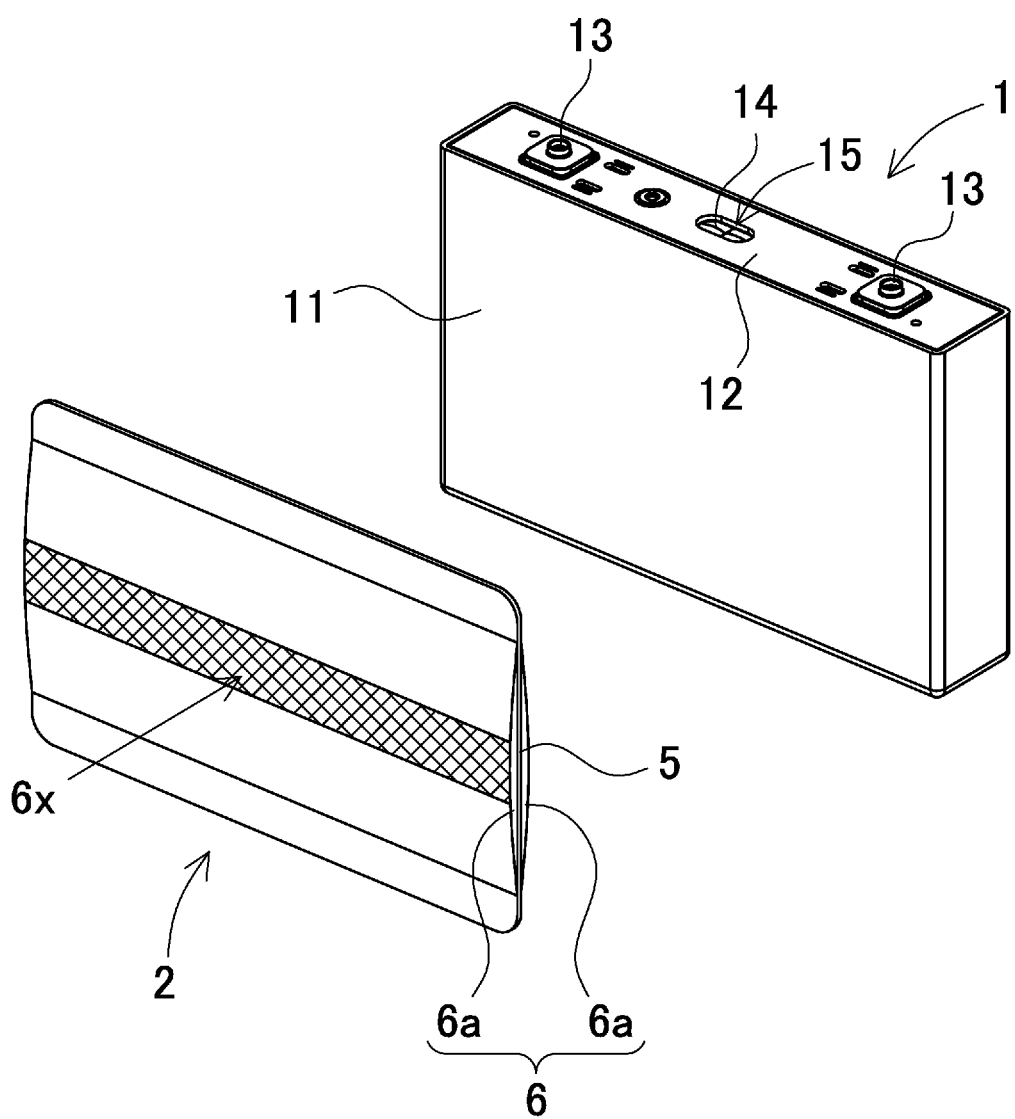
FIG. 4 is a perspective view illustrating a separator and a battery cell.

As illustrated in FIG. 4, battery cell 1 of battery block 10 is a prismatic battery cell having a quadrangular outer shape, and includes battery case 11 that has a bottom closed and an opening to which sealing plate 12 is airtightly fixed by laser welding, and thus having an internally sealed structure. Sealing plate 12 is provided with a pair of positive and negative electrode terminals 13 protruding at both ends. Between electrode terminals 13, opening 15 of safety valve 14 is provided. Safety valve 14 opens to release internal gas when internal pressure of battery cell 1 rises to a predetermined value or more. Safety valve 14 prevents a rise in internal pressure of battery cell 1.

(Battery Cell 1)

Battery cell 1 is a lithium ion secondary battery. Power supply device 100 provided with a lithium ion secondary battery serving as battery cell 1 has an advantage in that charge capacity per volume and weight can be increased. However, battery cell 1 may be any other chargeable battery such as a non-aqueous electrolyte secondary battery other than the lithium ion secondary battery.

(End Plate 3, Binding Bar 4)

End plate 3 is a metal plate substantially coinciding in outer shape with battery cell 1 and is not deformed by being pressed by battery block 10, and binding bars 4 are coupled to both side edges of end plate 3. Binding bars 4 fix battery block 10 in a compressed state under a predetermined pressure while end plates 3 couple battery cells 1 stacked in a compressed state.

(Separator 2)

Separator 2 is sandwiched between adjacent battery cells 1, which are stacked, to absorb expansion of battery cells 1 and insulate adjacent battery cells 1, and further blocks heat conduction between adjacent battery cells 1. Battery block 10 includes bus bars (not illustrated) fixed to electrode terminals 13 of adjacent battery cells 1 to connect battery cells 1 in series or in parallel. Battery cells 1 connected in series cause a potential difference to be generated between battery cases 11, and thus are stacked while being insulated by separator 2. Although battery cells 1 connected in parallel cause no potential difference to be generated between battery cases 11, battery cells 1 are stacked while being thermally insulated by separator 2 to prevent induction of thermal runaway.

Figure 5:
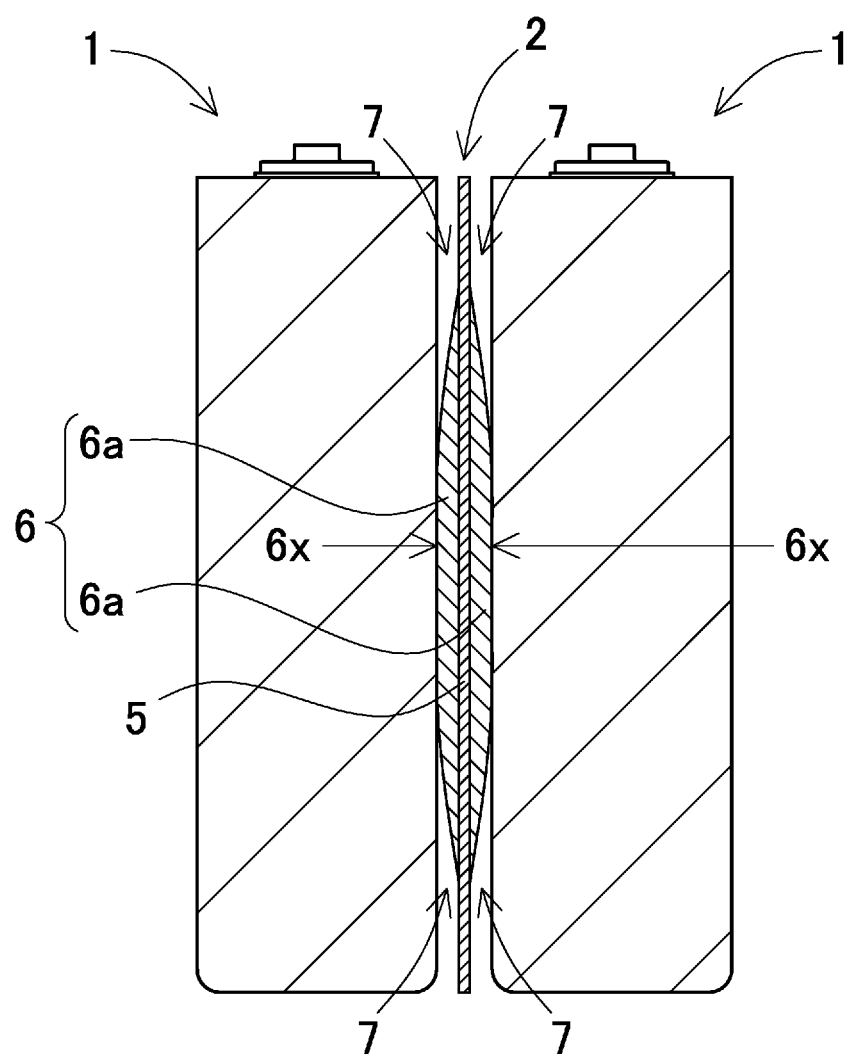
FIG. 5 is an enlarged sectional view illustrating a stacked state of a separator and a battery cell.

As illustrated in FIGS. 4 and 5, separator 2 includes elastic layer 6 layered on a surface of heat-insulating sheet 5. Heat-insulating sheet 5 is made of hybrid material 5A of an inorganic powder and a fibrous reinforcing material. The inorganic powder is preferably silica aerogel. Heat-insulating sheet 5 made of hybrid material 5A is filled with the inorganic powder such as the silica aerogel having extremely low thermal conductivity in a gap between fibers. As heat-insulating sheet 5, a resin sheet may be used other than that made of hybrid material 5A.

Elastic layer 6 has elastic protrusion 6a that is elastically deformed thinly by being pressed. Around elastic protrusion 6a, deformation space 7 for elastic body 6 of elastic protrusion 6a to be displaced is provided between battery cell 1 and separator 2. Elastic layer 6 absorbs expansion and contraction of battery cell 1 when elastic protrusion 6a is elastically crushed with a pressing force of battery cell 1. Elastic layer 6 not only absorbs expansion of battery cell 1 but also protects heat-insulating sheet 5 from an excessive pressure to prevent deterioration of heat insulation characteristics of heat-insulating sheet 5 due to the pressure.

Heat-insulating sheet 5 made of hybrid material 5A of the silica aerogel and the fibrous reinforcing material is deteriorated in heat insulation characteristics when the silica aerogel that is fragile is compressed and broken. Elastic layer 6 reduces compressive stress to be applied to the silica aerogel at the time of expansion of battery cell 1 to prevent breakage of the silica aerogel, thereby ensuring excellent heat insulation characteristics of heat-insulating sheet 5 over a long period of time to prevent thermal runaway of battery cell 1 and induction of the thermal runaway.

(Heat-Insulating Sheet 5)

Heat-insulating sheet 5 is made of hybrid material 5A of the inorganic powder such as silica aerogel and the fibrous reinforcing material. Heat-insulating sheet 5 made of hybrid material 5A includes silica aerogel having a nano-sized porous structure and a fiber sheet. This heat-insulating sheet 5 is manufactured by impregnating fibers with a gel raw material of silica aerogel. After the fiber sheet is impregnated with the silica aerogel, the fibers are stacked to cause the gel raw material to react to form a wet gel. Then, a surface of the wet gel is hydrophobized and dried with hot air to manufacture heat insulating layer 5. The fibers of the fiber sheet are polyethylene terephthalate (PET). However, as the fibers of the fiber sheet, inorganic fibers such as oxidized acrylic fibers subjected to flame-retardant treatment and glass wool can also be used.

The fiber sheet of heat-insulating sheet 5 preferably has a fiber diameter of 0.1 μm to 30 μm. Reducing the fiber diameter of the fiber sheet to smaller than 30 μm reduces heat conduction through the fibers to enable improving heat insulation characteristics of heat-insulating sheet 5. The silica aerogel is inorganic fine particles composed of 90% to 98% air, and has fine pores between skeletons formed by clusters in which nano-order spherical bodies are bonded, thereby forming a three-dimensional fine porous structure.

Heat-insulating sheet 5 composed of the fiber sheet and the silica aerogel is thin and exhibits excellent heat insulation characteristics. Heat-insulating sheet 5 is set to a thickness capable of preventing induction of thermal runaway of battery cell 1 in consideration of energy generated by thermal runaway of battery cell 1. The energy generated by the thermal runaway of battery cell 1 increases as charge capacity of battery cell 1 increases. Thus, the thickness of heat-insulating sheet 5 is set to an optimum value in consideration of the charge capacity of battery cell 1. For example, a power supply device using a lithium ion secondary battery having a charge capacity of 5 Ah to 20 Ah as battery cell 1 includes heat-insulating sheet 5 having a thickness set to 0.5 mm to 2 mm, optimally to about 1 mm to 1.5 mm. However, the present invention does not specify the thickness of heat-insulating sheet 5 within the above range, and the thickness of heat-insulating sheet 5 is set to an optimum value in consideration of heat insulation characteristics of a combination of the fiber sheet and the silica aerogel for the thermal runaway and heat insulation characteristics required for preventing induction of the thermal runaway of battery cell 1.

(Elastic Layer 6)

As illustrated in FIGS. 4 and 5, separator 2 includes elastic layer 6 layered on a surface of heat-insulating sheet 5. As separator 2 increases in thickness, battery block 10 increases in size when separator 2 is stacked between corresponding battery cells 1. Battery block 10 is required to be downsized, so that separator 2 is required to achieve heat insulation characteristics at a minimum thickness. This is because power supply device 100 is required to be increased in charge capacity per volume. Thus, it is important for power supply device 100 to prevent induction of thermal runaway of battery cell 1 using separator 2 reduced in thickness entirely to downsize battery block 10 and increase the charge capacity. For this reason, elastic layer 6 is set to, for example, 0.2 mm or more and 2 mm or less, more preferably to 0.3 mm to 1 mm or less to suppress an increase in compressive stress due to expansion of battery cell 1. Elastic layer 6 preferably reduces compressive stress when battery cell 1 expands, while being reduced in thickness to less than that of heat-insulating sheet 5.

Elastic layer 6 is a non-foamed elastic body. Besides the non-foamed elastic body, an elastic body of a thermoplastic elastomer or urethane foam may be used. Elastic protrusion 6a made of the non-foamed elastic body has incompressibility that allows volume to hardly change due to compression and thus pushes out the elastic body compressed and crushed to deformation space 7, and then elastic protrusion 6a is deformed thinly. The elastic body of elastic layer 6 is preferably a synthetic rubber, a thermoplastic elastomer, or foamed urethane. The synthetic rubber suitably has a heat resistance limit temperature of 100° C. or higher. Available examples of the synthetic rubber include silicone rubber, fluororubber, urethane rubber, isoprene rubber, styrene butadiene rubber, butadiene rubber, chloroprene rubber, nitrile rubber, hydrogenated nitrile rubber, polyisobutylene rubber, ethylene propylene rubber, ethylene vinyl acetate copolymer rubber, chlorosulfonated polyethylene rubber, acrylic rubber, epichlorohydrin rubber, thermoplastic olefin rubber, ethylene propylene diene rubber, butyl rubber, polyether rubber, and the like.

In particular, the fluororubber and the silicone rubber have a considerably high heat resistance limit temperature of 230° C., and are characterized by being capable of retaining rubber-like elasticity while being heated by battery cell 1 at high temperature and of stably absorbing expansion of battery cell 1 that generates heat at high temperature. Additionally, the acrylic rubber has a heat resistance limit temperature of 160° C., and the hydrogenated nitrile rubber, the ethylene propylene rubber, and the butyl rubber each have a heat resistance limit temperature of 140° C., the heat resistance limit temperatures being 100° C. or higher, so that expansion of even battery cell 1 generating heat at high temperature can be stably absorbed.

Figure 11:
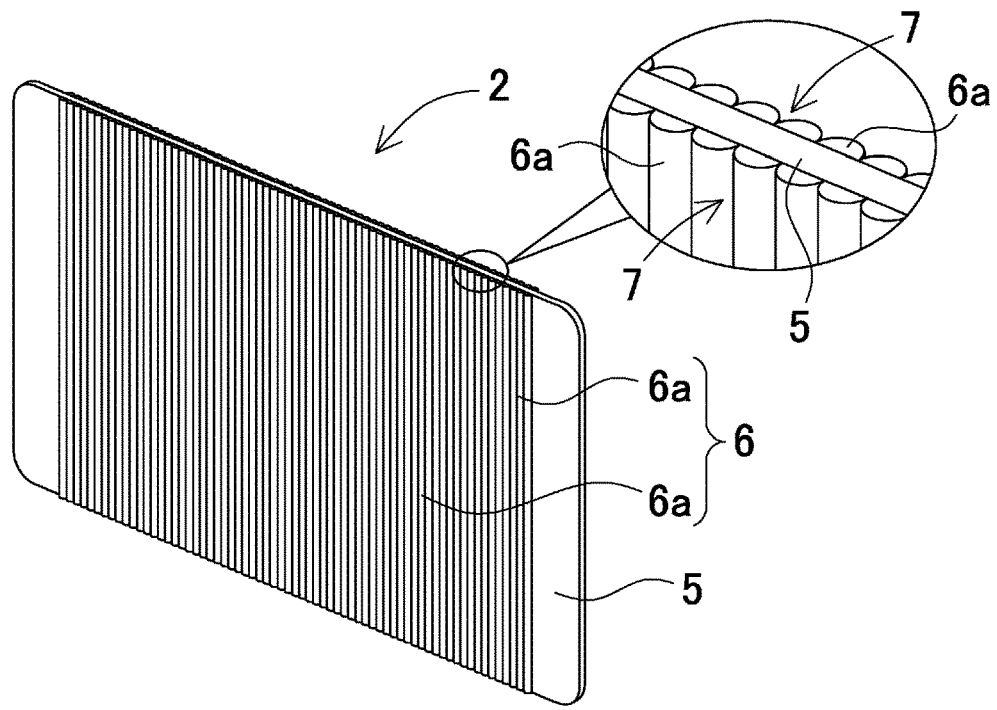
FIG. 11 is a partially enlarged perspective view illustrating yet another example of a separator.
Figure 12:
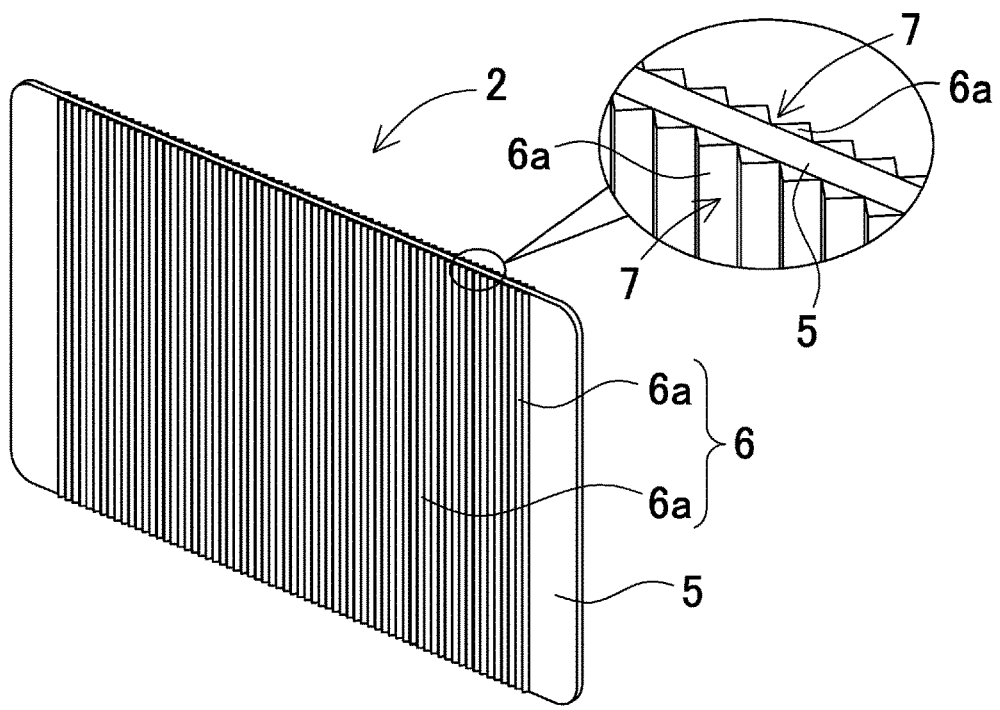
FIG. 12 is a partially enlarged perspective view illustrating yet another example of a separator.
Figure 13:
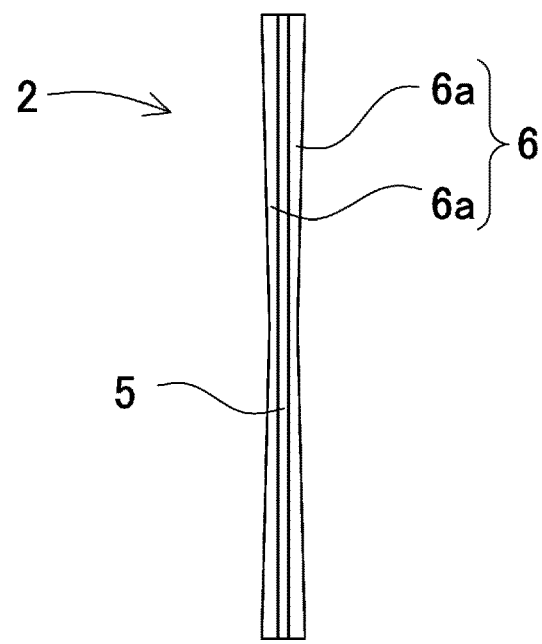
FIG. 13 is a vertical sectional view illustrating yet another example of a separator.

The sectional views and the perspective views of FIGS. 4 to 13 illustrate separator 2 provided with elastic protrusion 6a and deformation space 7. Separator 2 in FIGS. 4 and 5 is provided with one elastic protrusion 6a at a central part of heat-insulating sheet 5, and deformation space 7 is provided around elastic protrusion 6a. Separator 2 illustrated in the sectional view of FIG. 6 and the perspective views of FIGS. 7 to 10 is provided with a plurality of elastic protrusions 6a in a region excluding upper and lower end parts, and separator 2 illustrated in FIGS. 11 to 13 is provided with elastic protrusions 6a in a region excluding opposite side edge parts, and deformation space 7 is provided between elastic protrusions 6a. Separators 2 described above each include elastic layer 6 layered on heat-insulating sheet 5 provided with elastic protrusion 6a with a central part protruding in a mountain shape to be in adhesion to battery cell 1. Elastic protrusion 6a described above is provided at its central part with contact part 6x in contact with battery cell 1 and has a shape in which outer sides of contact part 6x are each inclined downward toward an outer periphery of separator 2.

Separator 2 in FIGS. 4 and 5 has a strip shape in which contact part 6x extends in its width. This separator 2 can adjust an area where elastic protrusion 6a comes into adhesion to with battery cell 1 by adjusting a vertical width of contact part 6x in the strip shape. Elastic protrusion 6a can be reduced in contact pressure with a case surface of battery cell 1 by increasing a vertical width of contact part 6x, and can be increased in the contact pressure by reducing the vertical width. Separator 2 in FIGS. 4 and 5 is provided at its central part with a row of elastic protrusions 6a. Separators 2 of FIGS. 7 to 10 each include a plurality of rows of an elastic protrusion, being disposed parallel to each other. Elastic protrusion 6a in a strip shape can be provided in a shape extending in the width as illustrated in the drawing, in a shape extending vertically as illustrated in FIGS. 11 to 13, or in a grid shape (not illustrated). Separator 2 provided with the plurality of rows of elastic protrusion 6a can be adjusted in contact pressure with the case surface of battery cell 1 by changing an interval and height of elastic protrusions 6a. The shape of battery cell 1 expanding can be controlled by changing shape, width, height, and the like of each elastic protrusion 6a.

Figure 6:
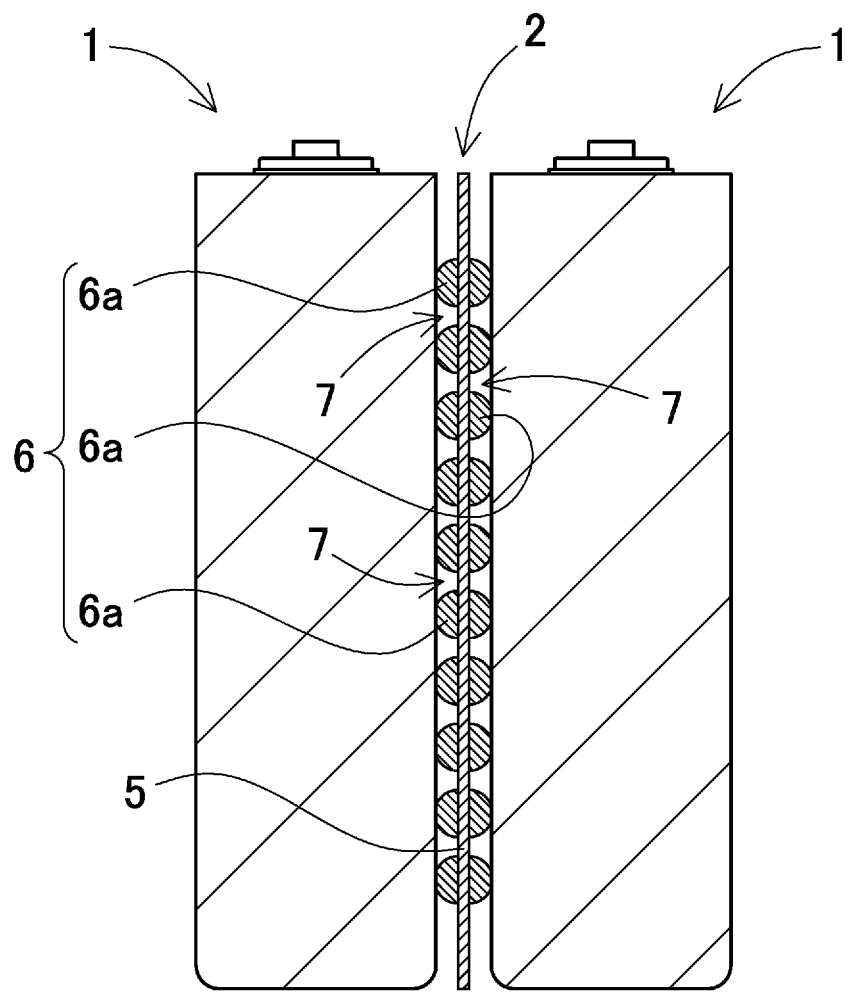
FIG. 6 is an enlarged sectional view illustrating a stacked state of a separator and a battery cell according to another example.
Figure 7:
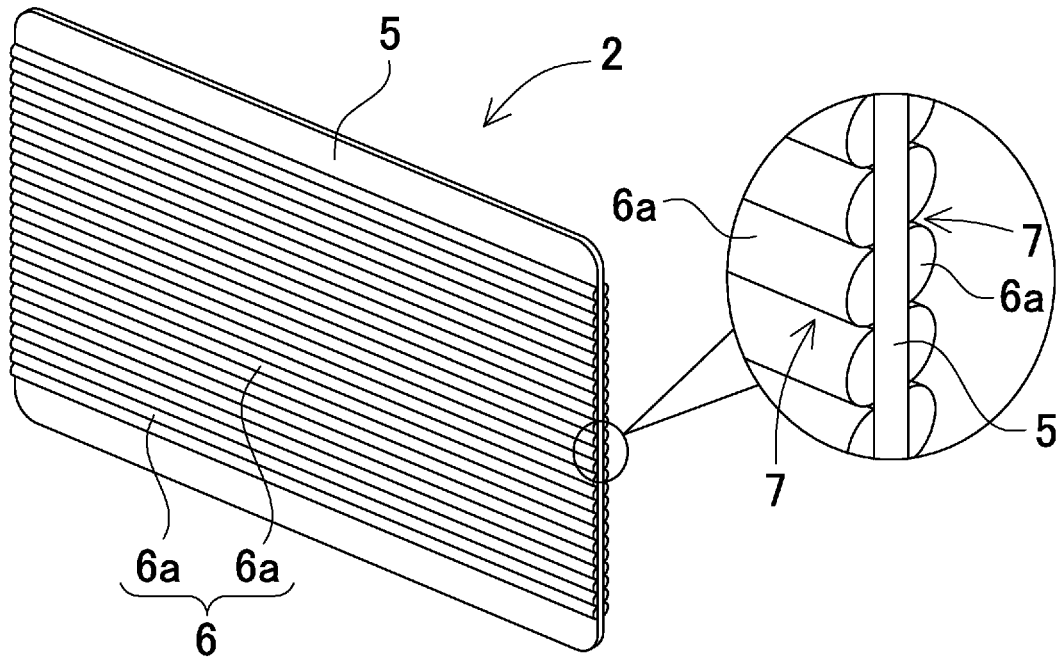
FIG. 7 is a partially enlarged perspective view illustrating another example of a separator.
Figure 8:
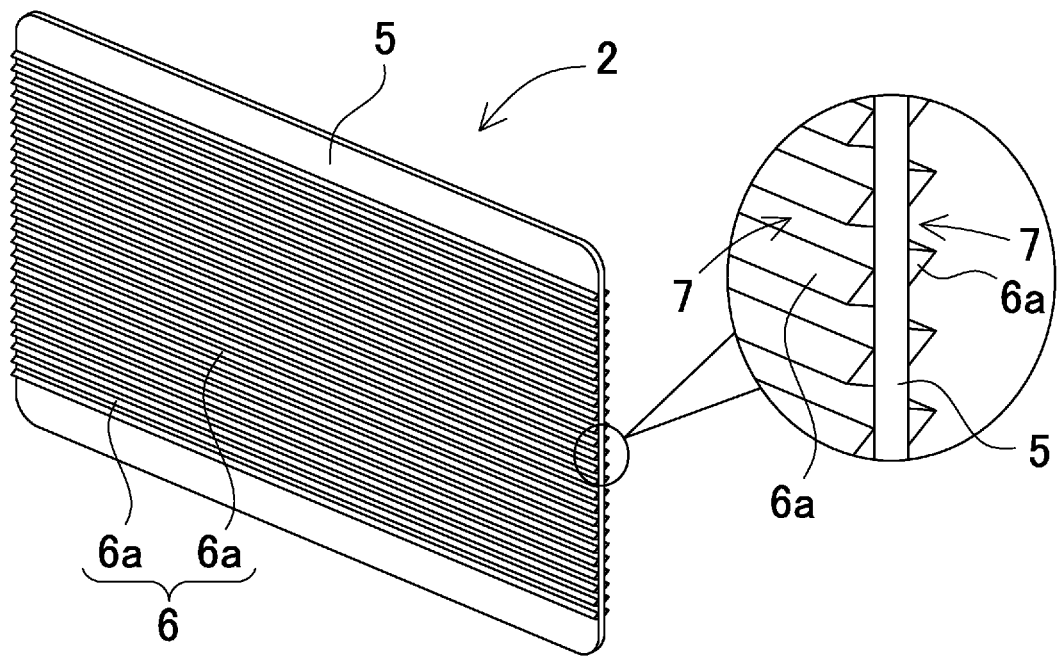
FIG. 8 is a partially enlarged perspective view illustrating yet another example of a separator.
Figure 9:
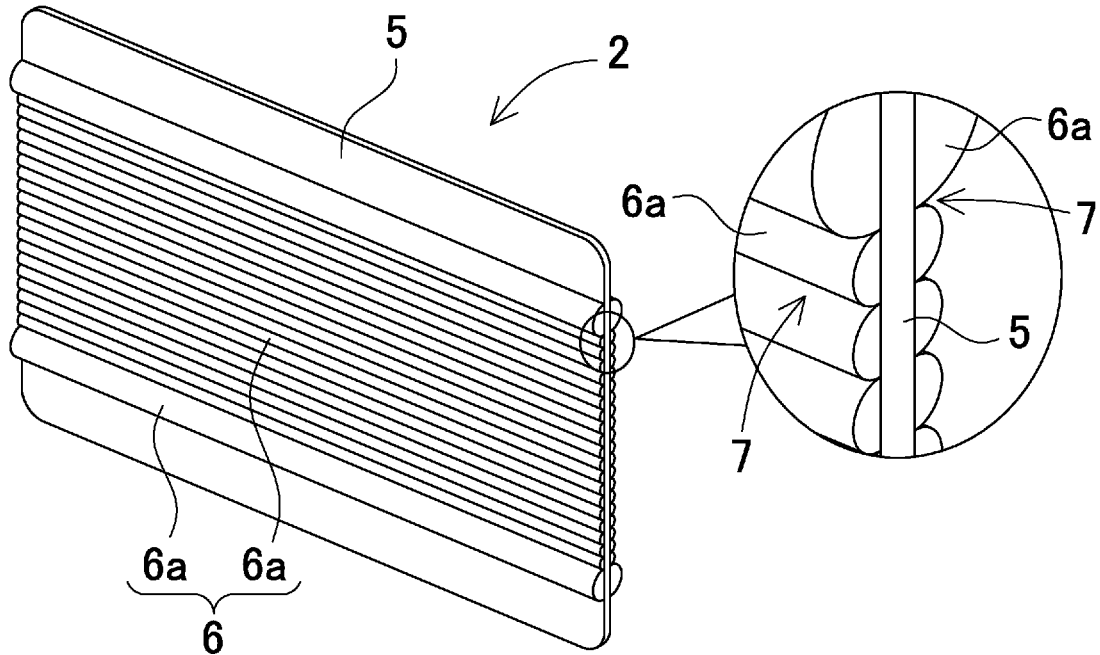
FIG. 9 is a partially enlarged perspective view illustrating yet another example of a separator.
Figure 10:
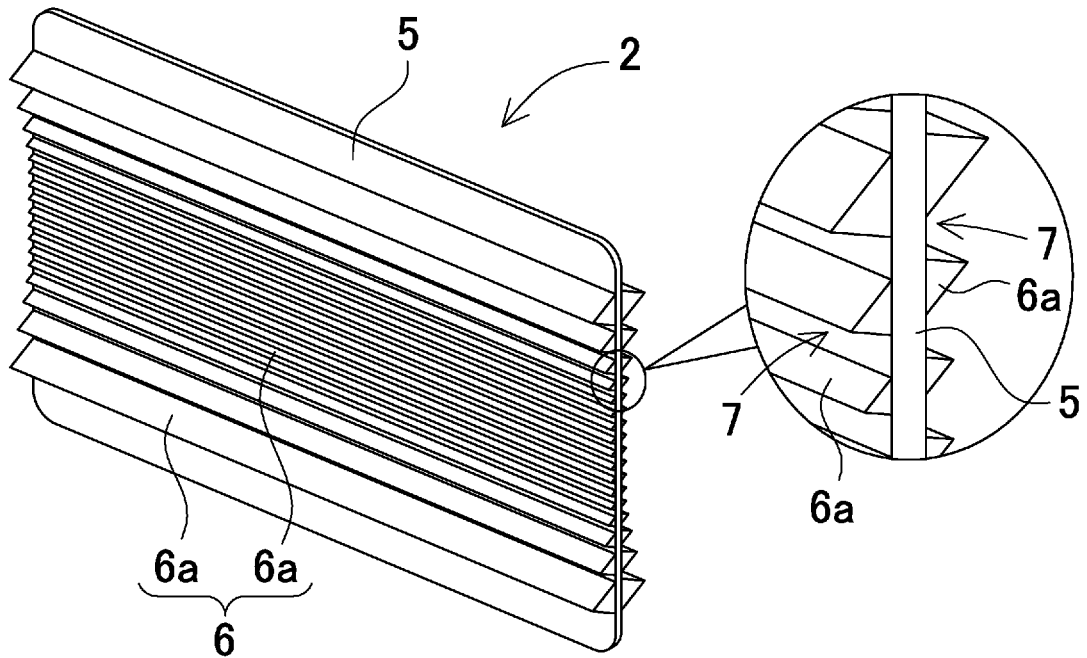
FIG. 10 is a partially enlarged perspective view illustrating yet another example of a separator.

Separator 2 of FIG. 6 includes a plurality of elastic protrusions 6a that is disposed in a locally interspersed manner. This separator 2 includes elastic layer 6 that can control the case surface of battery cell 1 expanding in an optimal shape by adjusting placement, size, height, and the like of each elastic protrusion 6a. As illustrated in FIGS. 7 to 13, separator 2 provided with the plurality of rows of elastic protrusion 6a can control shape of the case surface of the battery cell expanding in an optimal shape by adjusting shape, placement, lateral width, pitch, height, and the like of elastic protrusions 6a. Separator 2 provided with a plurality of rows of elastic protrusion 6a or a plurality of elastic protrusions 6a can control a shape caused by expansion of the battery cell due to increase in internal pressure with each elastic protrusion 6a. Then, separators 2 of FIGS. 9 and 10 each have a shape in which elastic protrusions 6a in upper and lower parts are increased in height to restrict expansion of battery cell 1, so that expansion shape of battery cell 1 can be formed into a shape with upper and lower parts reduced in height and a vertically central part protruding high. As illustrated in FIGS. 11 and 12, a separator is provided with elastic protrusions 6a extending vertically. As illustrated in the sectional view of FIG. 13, elastic protrusions 6a each have upper and lower parts increased in height and a central part reduced in height to enable battery cell 1 to have an expansion shape with upper and lower parts reduced in height and a vertical central part protruding high. Separators 2 of FIGS. 7 to 12 each can control its state crushed by the battery cell expanding by forming elastic protrusion 6a in a plurality of rows into a triangular mountain shape (FIGS. 8, 10, and 12) or an arch-shaped mountain shape (FIGS. 7, 9, and 11) in section. Elastic protrusion 6a in the triangular mountain shape can be largely deformed with a pressing force of the battery cell expanding, and that in the arch-shaped mountain shape can be reduced in the amount of deformation against the pressing force of the battery cell expanding.

Although power supply device 100 described above is preferably configured such that all separators 2 have a structure in which elastic layers 6 are layered on both surfaces of heat-insulating sheet 5, all separators 2 do not necessarily have a structure in which elastic layers 6 are layered on both the surfaces of heat-insulating sheet 5. Although not illustrated, the separator can also have an elastic layer layered on one surface of the heat-insulating sheet. The power supply device is not necessarily configured such that all separators have a structure in which a heat-insulating sheet and an elastic layer are layered, so that a separator having only a heat-insulating sheet and a separator having a structure in which a heat-insulating sheet and an elastic layer are layered can be provided in a mixed manner.

Elastic layer 6 and heat-insulating sheet 5 are bonded to each other with an adhesive layer or a bonding layer interposed therebetween, or are bonded to each other using two-color molding, and are layered at a fixed position. Separator 2 and battery cell 1 are also bonded to each other with an adhesive layer agent or a bonding layer interposed therebetween and are each disposed at a fixed position. The separator can also be disposed at a fixed position of a battery holder (not illustrated) that disposes each of battery cells at a fixed position in a fitting structure.

Power supply device 100 described above includes battery cell 1 that is a prismatic battery cell having a charge capacity of 6 Ah to 80 Ah, heat-insulating sheet 5 of separator 2, being a "NASBIS (registered trademark) available from Panasonic Corporation" having a thickness of 1 mm in which a fiber sheet is filled with silica aerogel, and elastic layer 6 layered on both surfaces of heat-insulating sheet 5, being made of silicon rubber and having elastic protrusion 6a with a maximum thickness of 2 mm, so that expansion due to increase in internal pressure of specific battery cell 1 can be reasonably absorbed.

The power supply device described above can be used as an automotive power supply that supplies electric power to a motor used to drive an electric vehicle. Available examples of an electric vehicle equipped with the power supply device include a hybrid car or a plug-in hybrid car that is driven by an engine and a motor, and an electric vehicle such as an electric car that is driven only by a motor, and the power supply device can be used as a power supply for any of these vehicles. Power supply device 100 having high capacity and high output to acquire electric power for driving a vehicle will be described below, for example. Power supply device 100 includes a large number of the above-described power supply devices connected in series or parallel, as well as a necessary controlling circuit.

(Power Supply Device for Hybrid Vehicle)

Figure 15:
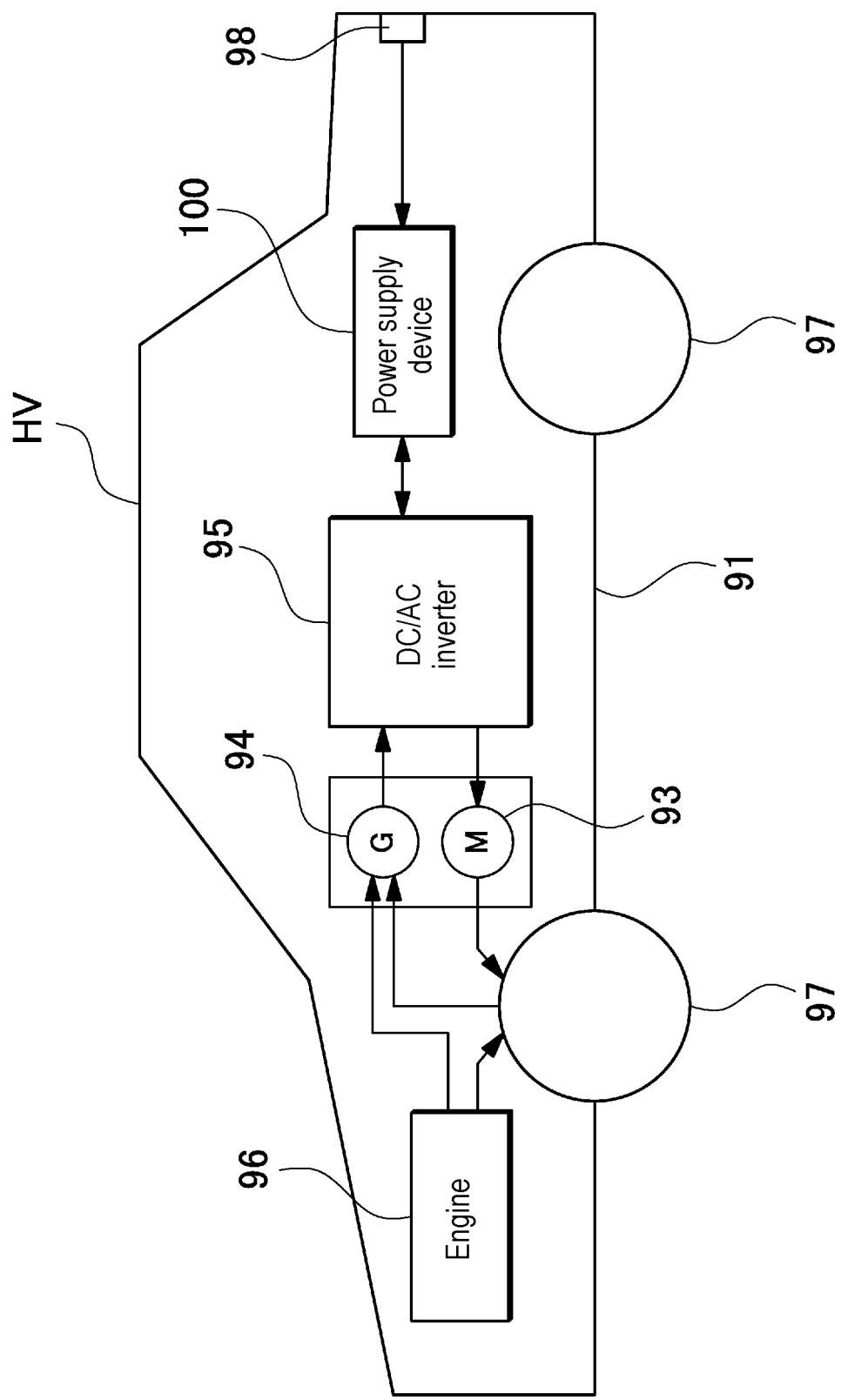
FIG. 15 is a block diagram illustrating an example of a power supply device mounted on a hybrid vehicle that is driven by an engine and a motor.

FIG. 15 illustrates an example of a power supply device mounted on a hybrid car that is driven by both an engine and a motor. Vehicle HV equipped with the power supply device illustrated in this drawing includes vehicle body 91, engine 96 and traction motor 93 to let vehicle body 91 travel, wheels 97 that are driven by engine 96 and traction motor 93, power supply device 100 to supply motor 93 with electric power, and generator 94 to charge batteries of power supply device 100. Power supply device 100 is connected to motor 93 and generator 94 via DC/AC inverter 95. Vehicle HV travels by both motor 93 and engine 96 while charging and discharging the battery of power supply device 100. Motor 93 is driven in a region where the engine efficiency is low, for example, during acceleration or low-speed travel, and causes the vehicle to travel. Motor 93 is driven by electric power supplied from power supply device 100. Generator 94 is driven by engine 96 or regenerative braking when the vehicle is braked, to charge the battery of power supply device 100. As illustrated in FIG. 15, vehicle HV may include charging plug 98 to charge power supply device 100. Connecting charging plug 98 to an external power supply enables charging power supply device 100.

(Power Supply Device for Electric Car)

Figure 16:
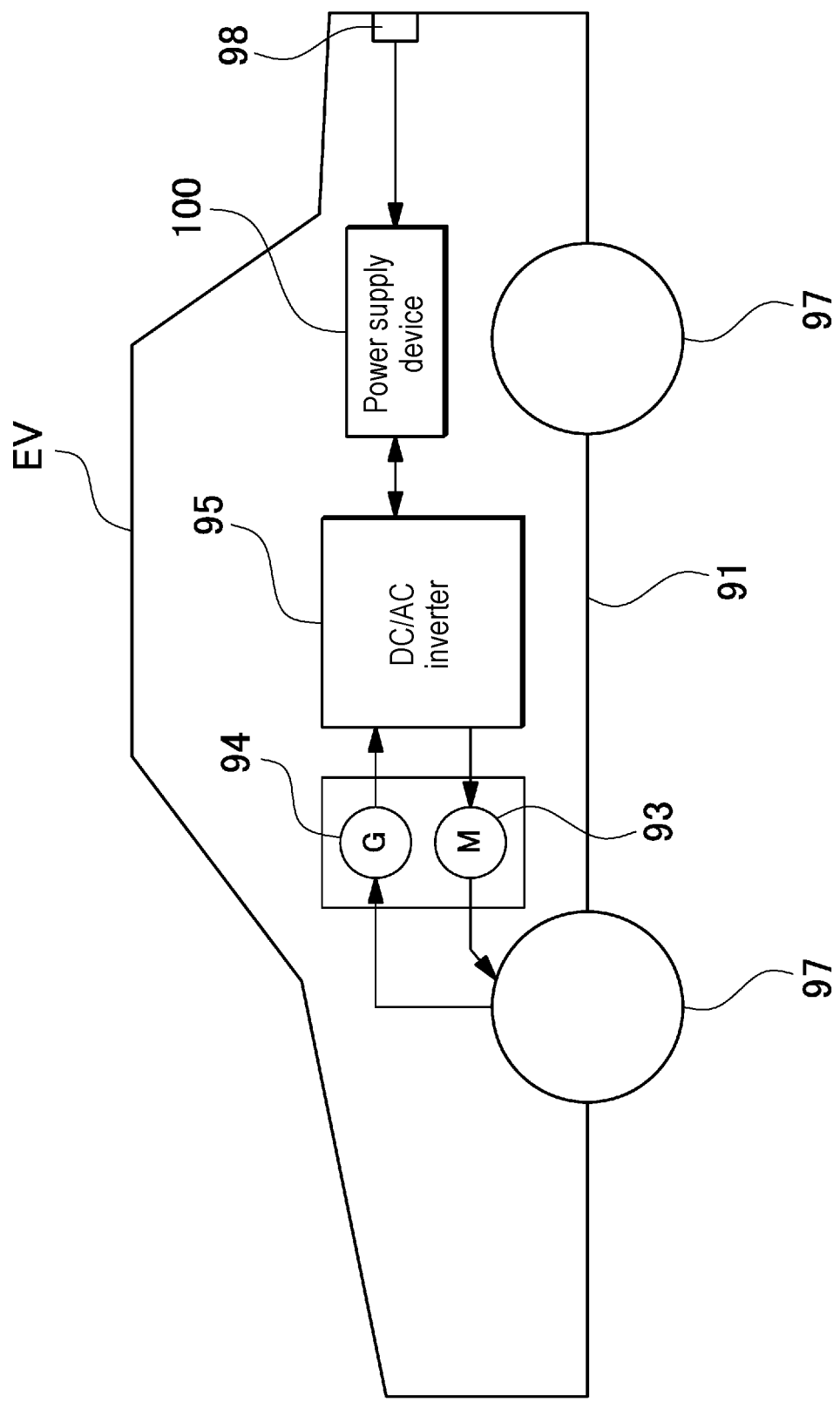
FIG. 16 is a block diagram illustrating an example of a power supply device mounted on an electric car that is driven only by a motor.

FIG. 16 illustrates an example of a power supply device mounted on an electric car that is driven only by a motor. Vehicle EV equipped with the power supply device illustrated in this figure includes vehicle body 91, traction motor 93 to let vehicle body 91 travel, wheels 97 that are driven by motor 93, power supply device 100 to supply motor 93 with electric power, and generator 94 to charge batteries of power supply device 100. Power supply device 100 is connected to motor 93 and generator 94 via DC/AC inverter 95. Motor 93 is driven by electric power supplied from power supply device 100. Generator 94 is driven by energy produced through regenerative braking of vehicle EV to charge the batteries of power supply device 100. Vehicle EV includes charging plug 98. Connecting charging plug 98 to an external power supply enables charging power supply device 100.

(Power Supply Device for Power Storage Device)

Figure 17:
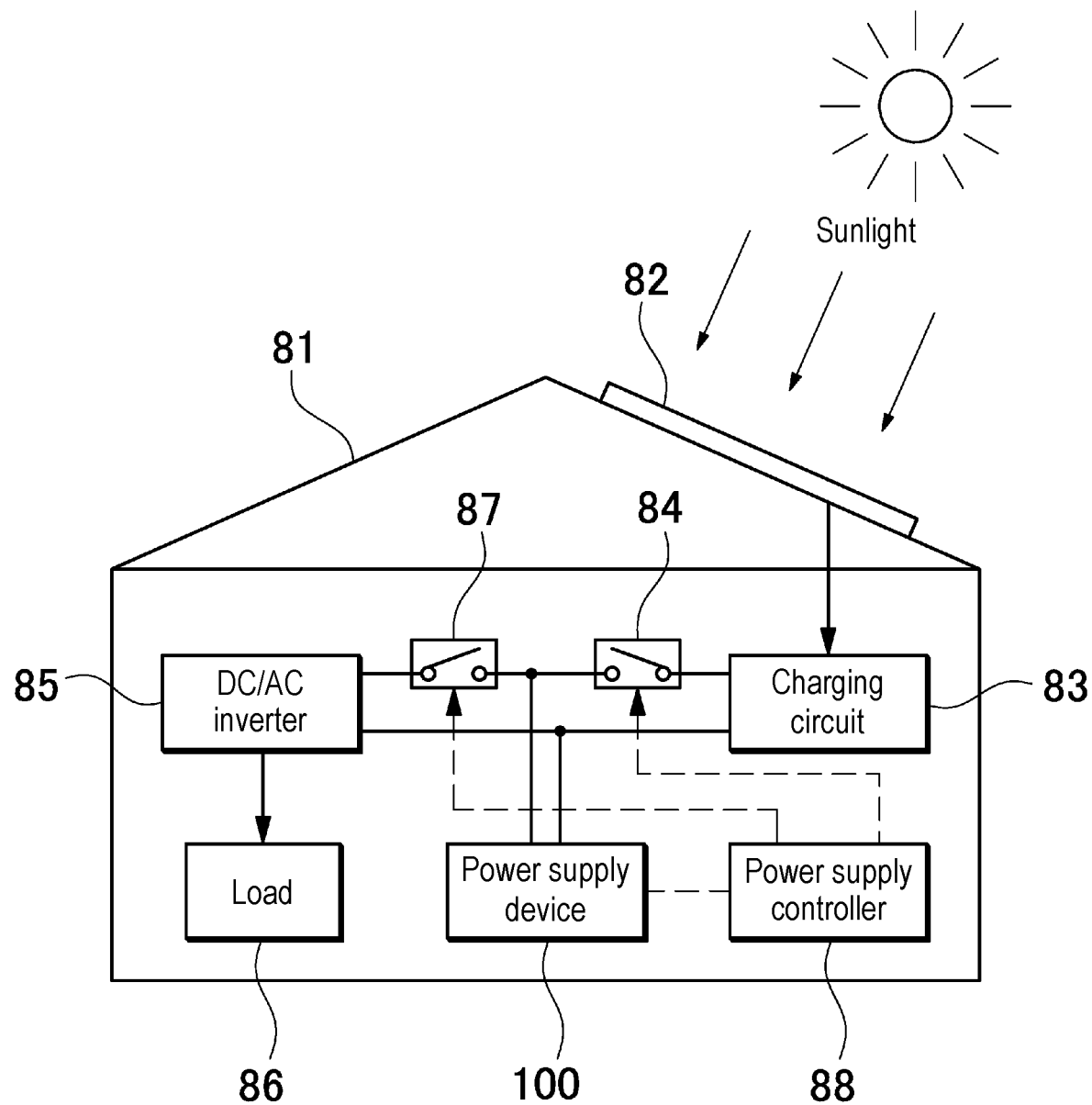
FIG. 17 is a block diagram illustrating an example of the technique applied to a power supply device for power storage.

The present invention does not limit a use of the power supply device to a power supply of a motor that causes a vehicle to travel. The power supply device according to the exemplary embodiment can be used as a power supply for a power storage device that stores electricity by charging a battery with electric power generated by photovoltaic power generation, wind power generation, or other methods. FIG. 17 illustrates a power storage device that stores electricity by charging batteries of power supply device 100 with solar battery 82.

The power storage device illustrated in FIG. 17 charges the batteries of power supply device 100 with electric power generated by solar battery 82 that is disposed, for example, on a roof or a rooftop of building 81 such as a house or a factory. The power storage device charges the batteries of power supply device 100 through charging circuit 83 with solar battery 82 serving as a charging power supply, and then supplies electric power to load 86 via DC/AC inverter 85. Thus, the power storage device has a charge mode and a discharge mode. The power storage device illustrated in the drawing includes DC/AC inverter 85 and charging circuit 83 that are connected to power supply device 100 via discharging switch 87 and charging switch 84, respectively. Discharging switch 87 and charging switch 84 are turned on and off by power supply controller 88 of the power storage device. In the charge mode, power supply controller 88 turns on charging switch 84 and turns off discharging switch 87 to allow charging from charging circuit 83 to power supply device 100. When charging is completed and the batteries are fully charged or when the batteries are charged to a predetermined level or higher for capacity, power supply controller 88 turns off charging switch 84 and turns on discharging switch 87 to switch to the discharge mode and permits power supply device 100 to discharge electricity into load 86. When needed, the power supply controller can supply electricity to load 86 and charge power supply device 100 simultaneously by turning charging switch 84 and discharging switch 87 on.

Although not illustrated, the power supply device can also be used as a power supply of a power storage device that stores electricity by charging a battery using midnight power at night. The power supply device charged with the midnight power can limit the peak power during the daytime to a small value by charging with the midnight power that is the surplus power of the power plant, and by output of the power during the daytime when the power load increases. The power supply device can also be used as a power supply that is charged with both output power of a solar battery and the midnight power. This power supply device can effectively store both electric power generated by a solar cell and midnight electric power, and can efficiently store electricity in consideration of weather and power consumption.

The power storage device described above can be suitably used for the following applications: a backup power supply device mountable in a rack of a computer server; a backup power supply device used for radio base stations of cellular phones; a power supply for storage used at home or in a factory; a power storage device combined with a solar battery, such as a power supply for street lights; and a backup power supply for traffic lights or traffic displays for roads.

INDUSTRIAL APPLICABILITY

The power supply device according to the present invention is suitably used as a large current power supply used for a power supply of a motor for driving a hybrid car, a fuel cell car, an electric car, or an electric vehicle such as an electric motorcycle, for example. Examples of the power supply device according to the present invention include a power supply device for a plug-in hybrid electric car and a hybrid electric car, being capable of switching a traveling mode between an EV traveling mode and an HEV traveling mode, and a power supply device for an electric car. The power supply device can also be appropriately used for the following applications: a backup power supply device mountable in a rack of a computer server; a backup power supply device used for radio base stations of cellular phones; a power supply for storage used at home or in a factory; a power storage device combined with a solar battery, such as a power supply for street lights; and a backup power supply for traffic lights.

REFERENCE MARKS IN THE DRAWINGS

100 power supply device
1 battery cell
2 separator
3 end plate
4 binding bar
5 heat-insulating sheet
6 elastic layer
6a elastic protrusion
6x contact part
7 deformation space
10 battery block
11 battery case
12 sealing plate
13 electrode terminal
14 safety valve
15 opening
81 building
82 solar battery
83 charging circuit
84 charging switch
85 DC/AC inverter
86 load
87 discharging switch
88 power supply controller
91 vehicle body
93 motor
94 generator
95 DC/AC inverter
96 engine
97 wheel
98 charging plug
HV, EV vehicle

The invention claimed is:
1. A power supply device comprising:
a battery block including a plurality of battery cells stacked in a thickness with a separator interposed between corresponding battery cells among the plurality of battery cells;
a pair of end plates disposed on respective end faces of the battery block; and
a binding bar coupled to the pair of end plates to fix the battery block in a compressed state together with the end plates,
the separator including:
a heat-insulating sheet; and
an elastic layer layered on a surface of the heat-insulating sheet,
the elastic layer including an elastic protrusion that is partially in adhesion to a surface of a case of a corresponding battery cell among the corresponding battery cells and is deformed by expansion of the corresponding battery cell,
wherein a deformation space is provided between the corresponding battery cell and the separator for the elastic protrusion pressed by the corresponding battery cell to be displaced in an outer peripheral direction orthogonal to a pressing direction,
wherein the elastic layer is provided at a central part of the elastic layer, excluding an upper end part and a lower end part of the elastic layer, with an elastic protrusion that protrudes to be in adhesion to the corresponding battery cell,
wherein the elastic layer includes a plurality of elastic protrusions formed in a row along the central part each being the elastic protrusion, and
where the deformation space is provided as a gap formed between each of the elastic protrusions adjacent to each other among the plurality of elastic protrusions.
2. The power supply device according to claim 1, wherein the heat-insulating sheet including a hybrid material of an inorganic powder and a fibrous reinforcing material.
3. The power supply device according to claim 2, wherein the inorganic powder is silica aerogel.
4. The power supply device according to claim 1, wherein the separator is provided with the elastic layer that is layered on each of both surfaces of the heat-insulating sheet.
5. The power supply device according to claim 1, wherein at least one elastic protrusion is bonded to the surface of the case of the corresponding battery cell.
6. The power supply device according to claim 1, wherein the elastic layer including at least one selected from synthetic rubber, thermoplastic elastomer, and urethane foam.
7. The power supply device according to claim 1, wherein the elastic layer includes a thickness of 0.2 mm or more and 3 mm or less in an uncompressed state.
8. An electric vehicle comprising:
the power supply device according to claim 1;
a motor for travelling that receives electric power from the power supply device;
a vehicle body equipped with the power supply device and the motor; and
a wheel that is driven by the motor to cause the vehicle body travel.
9. A power storage device comprising:
the power supply device according to claim 1;

a power supply controller to control charging and discharging of the power supply device, wherein the power supply controller enables charging of the plurality of battery cells with electric power supplied from an outside and causes the plurality of battery cells to charge.

* * * * *